United States Patent [19]
Edwards

[11] Patent Number: 5,354,041
[45] Date of Patent: Oct. 11, 1994

[54] TORSION BAR STIFFENER

[76] Inventor: Roger W. Edwards, 3307 220 Ave. SE., Issaquah, Wash. 98027

[21] Appl. No.: 998,622

[22] Filed: Dec. 30, 1992

[51] Int. Cl.$^5$ .............................................. B60G 11/18
[52] U.S. Cl. ....................................... 267/277; 267/66; 267/188; 280/695
[58] Field of Search ............... 267/188, 191, 273, 277, 267/278, 154, 66, 68; 280/695, 700, 721, 664; 24/20 LS, 21, 16 R, 457, 493

[56] References Cited

U.S. PATENT DOCUMENTS

| | | | |
|---|---|---|---|
| 1,199,528 | 9/1916 | Carbaugh et al. | 267/66 |
| 1,649,691 | 11/1927 | Hearn | 267/66 |
| 3,773,349 | 11/1973 | Boyd | 267/66 X |
| 4,648,620 | 3/1987 | Nuss | 280/689 |
| 4,863,148 | 9/1989 | Hufnagel | 280/695 X |
| 4,884,790 | 12/1989 | Castrilli | 267/154 |

FOREIGN PATENT DOCUMENTS

| | | | |
|---|---|---|---|
| 2504069 | 10/1982 | France | 280/700 |
| 1455115 | 11/1976 | United Kingdom | 267/273 |

Primary Examiner—Robert J. Oberleitner
Assistant Examiner—Josie A. Ballato
Attorney, Agent, or Firm—Delbert J. Barnard

[57] ABSTRACT

A device used to increase the spring rate of a torsion bar spring commonly used in front suspensions of automobiles and light trucks. Consisting of at least two main parts this device is clamped around the torsion bar with screws and held firmly in place at determined intervals. The intervals being such that the friction generated at the clamped sections is sufficient to transmit the torsional loading of the torsion bar through the device effectively increasing the torsional resistance of the overall torsion bar. Since friction is used to transmit the torsional loading no modifications to the torsion bar are required.

8 Claims, 2 Drawing Sheets

TORSION BAR STIFFENER

BACKGROUND OF THE INVENTION

1. Field Of the Invention

The subject invention generally pertains to torsion springs of the bar type, such as torsion bar springs used in some automotive suspensions. More specifically, the invention relates to the provision of a stiffener for a torsion bar spring.

2. Description of Related Art

In the design of automotive suspensions it is occasionally preferable to use torsion springs rather than the more widely used coil springs. Typically a vehicle will have two torsion bars, one for each front wheel. The rear wheels generally use leaf or coil springs. These torsion bars are used as part of the suspension system that suspends the body of the vehicle from the wheels. The ride characteristics of a vehicle are determined by the rate of movement between the wheels and vehicle body under various conditions. This separation of wheel movement from body movement is determined by the weight of the vehicle, the weight of the wheel assembly, the stiffness of the springs and the amount of damping from the shock absorbers used to limit the velocity of the wheels relative to the vehicle body. The appropriate torsion bar stiffness is selected based upon normal vehicle operations. If one or more of the vehicle components change such as the vehicle weight, the damping rate of the shock absorbers, or the weight of the wheel assembly, such as with heavier or lighter wheels and tires, or addition of a stabilizer bar, a corresponding change in spring rate is desirable to maintain or improve the vehicles ride characteristics. When torsion bars are designed as part of a vehicles suspension system, the torsion bars are increased in diameter when a higher spring rate is desired.

Many of the changes made by the vehicle owner can affect the ride characteristics. Larger diameter torsion bars can be purchased to replace original torsion bars. This is seldom done by the vehicle owner and is generally delegated to experienced mechanics, and so becomes an expensive proposition. As a result, many vehicle owners do not change torsion bars even though the ride characteristics may suffer dramatically. Having to replace torsion bars to increase the stiffness is a major obstacle.

The majority of prior work has related specifically to stabilizer bars on vehicles. Stabilizer bars are a single torsion spring that attaches the front or rear wheels transversely through bearing attachments to the vehicle chassis. Stabilizer bars effect the roll stiffness of the vehicle during cornering. The suspension stiffness remains unaffected except during cornering and during rough road conditions. Devices thus far used to increase the stiffness of torsion bar springs are limited to the design of original torsion bars and in particular stabilizer bars.

U.S. Pat. No. 4,648,620, is a concept that modifies the spring rate of a stabilizer bar when activated providing two possible spring rates. This secondary torsional reaction element must be welded onto the primary torsional reaction unit in order for the torsion to be transferred to the secondary torsional reaction unit when engaged. Welding is detrimental to torsion bars used as vehicle springs, except when properly heat treated as an assembly.

U.S. Pat. No. 4,884,790 describes a nonlinear torsion bar spring that increases the stiffness as a function of the angle of twist. The primary torsion reaction unit requires a longitudinal machined extrusion or depression be part of the engagement section that transfers load to the secondary torsion reaction unit. This machining as well as attachment of the secondary unit permanently to the primary torsion reaction unit precludes the use of the original torsion bar. The means of attachment cannot be by frictional means due to the length of the secondary torsion reaction unit and the reaction loads that would be applied. This bar also as described requires removal from the vehicle to be installed.

SUMMARY OF THE INVENTION

To avoid the limitations and problems encountered when torsion bar characteristics are inadequate, it is the object of the subject invention to provide a device that when installed on a torsion bar increases the stiffness of a torsion bar.

According to an aspect of the invention, a torsion bar stiffener is provided which comprises elongated first and second stiffener sections which together form an elongated tubular sleeve adapted to concentrically surround the torsion bar. The first and second stiffener sections are each one half of the tubular sleeve. The first stiffener section comprises axially spaced apart clamp pads. Each clamp pad has an inner surface substantially conforming to the outer surface of the torsion bar. The first stiffener section also includes a longitudinal torsional resistive section between the clamp pads. This section has an inner surface that is spaced radially outwardly from the outer surface of the torsion bar spring. The second stiffener section also comprises axially spaced apart clamp pads and a longitudinal torsional resistive section between the clamp pads. Each clamp pad has an inner surface substantially conforming to the outer surface of the torsional bar. The torsional resistive section has an inner surface that is spaced radially outwardly from the outer surface from the torsion bar. Each clamp pad inner surface confronts a clamp pad inner surface on the other stiffener section. Fasteners extend transversely of the stiffener, for securing the two stiffener sections together. The fasteners pull the clamp pad surfaces into tight clamping engagement with the torsion bar spring.

Another object is to provide an increase in torsion bar stiffness that is consistent. It does not change with the road conditions or any maneuver of the vehicle.

Another object of the subject invention is to provide an alternative to replacing torsion bars with stiffer torsion bars.

Another object is to provide the ability to adjust the amount of stiffness.

Another object is to provide the adjustment ability that is easily performed.

Another object is the time required to install or remove the device is short enough to be performed even for temporary vehicle changes.

Another object is ease of installation and removal. Installation can be performed by the vehicle owner and does not require an experienced mechanic.

These and other objects of the invention are provided by a novel device that attaches to a torsion bar by means of friction clamping. Increasing the spring rate of torsion bars is accomplished by clamping a torsional resistive section at both ends of the torsional resistive section to the torsion bar. This is done by clamping sections of the device around the present torsion bar. The additional torsional resistive section of the device effectively increases the spring rate of the entire torsion bar.

DESCRIPTION OF THE PREFERRED EMBODIMENT

Figure 1:
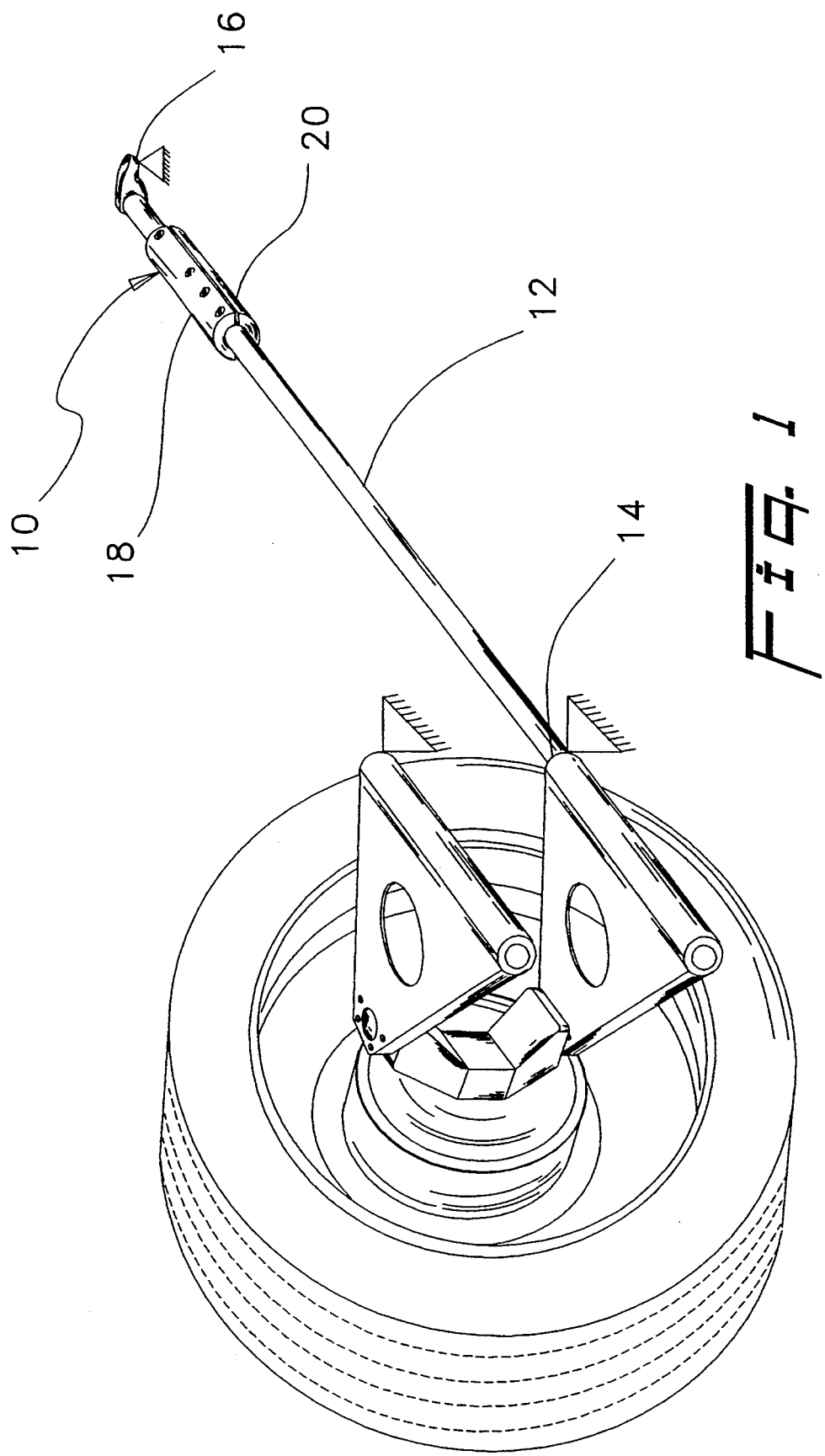
FIG. 1 is a pictorial view of an embodiment of the present invention installed on the torsion bar of a typical torsion bar front suspension.

Referring to the drawing, FIG. 1 shows a stiffener 10 installed on a torsion bar 12 that is attached to a typical suspension component 14 and the vehicle chassis 16. Placement of the stiffener 10 along the length of the torsion bar 12 can be where clearance permits with the preferred placement close to chassis 16 due to the lower angular movement of the torsion bar 12.

In preferred form, stiffener 10 is constructed in two parts or sections 18, 20.

Figure 2:
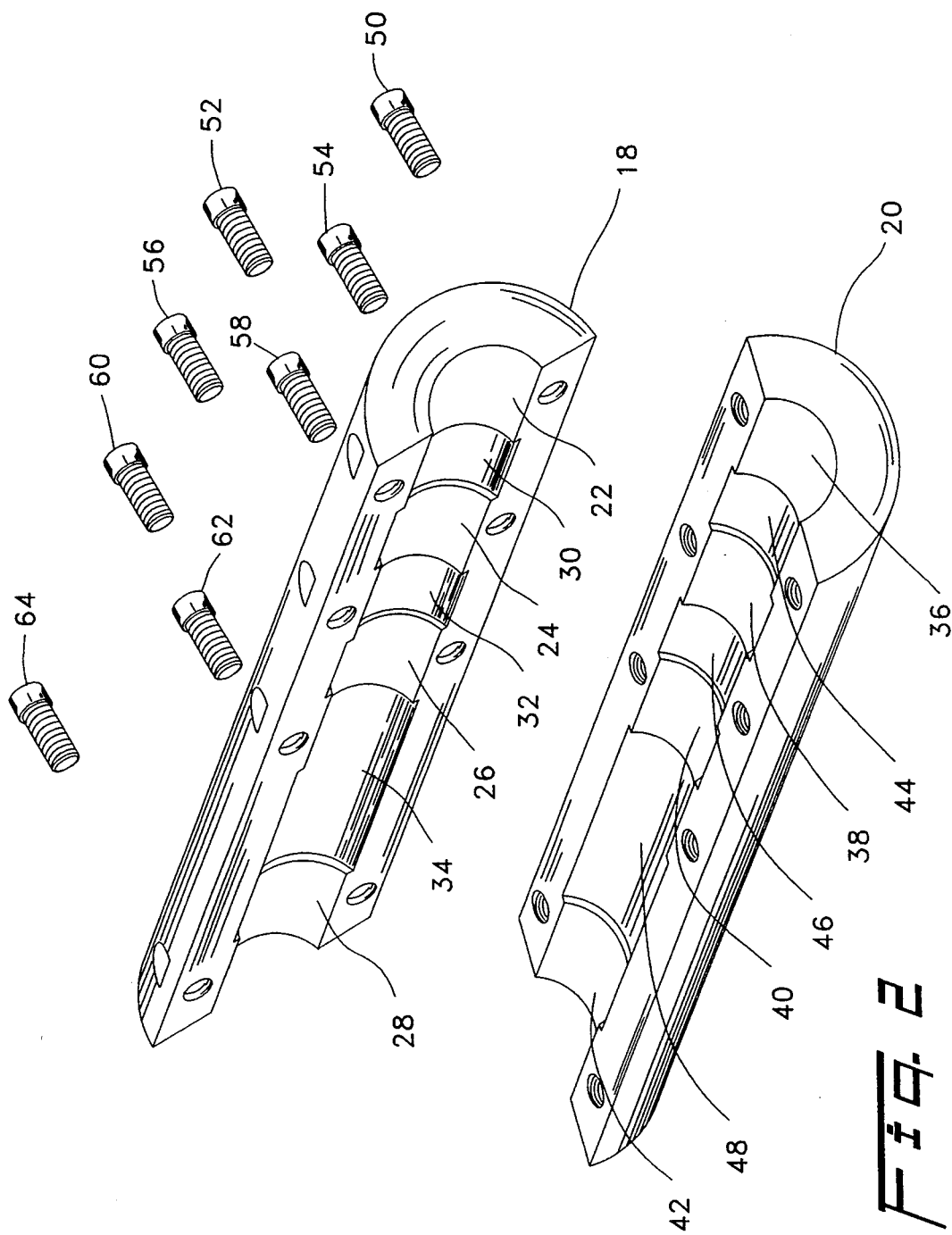
FIG. 2 is an exploded view of the components of the torsion bar stiffener shown by FIG. 1.

FIG. 2 shows an upper section 18 consisting of clamp pads 22, 24, 26, 28 connected by longitudinal torsional resistive sections 30, 32, 34. The lower section 20 consists of clamp pads 36, 38, 40, 42, connected by longitudinal torsional resistive sections 44, 46, 48. The clamp pads 22 and 30, 24 and 38, 26 and 40, 28 and 42 are held in firm contact with the torsion bar 12 by screws 50 and 52, 54 and 56, 58 and 60, and 62 and 64, respectively radially mirrored, and acting in conjunction with the clamp pads. This clamp pad force acts to cause sufficient friction to react the twist induced from the torsion bar 12 and keeps the clamp pads from relative radial movement with the torsion bar 12. This lack of relative motion induces the torsional force into the torsional resistive sections 30 and 38, 32 and 46, 34 and 48. Thus the torsional force is shared by the torsion bar 12 and the torsional resistive sections 30 and 38, 32 and 46, 34 and 48, increasing the effective torsional resistance of the torsion bar 12. The torsional resistance is the stiffness of a torsion bar 12. Thus the stiffness of the torsion bar 12 is increased.

The maximum spacing of two clamp pads longitudinally along the torsion bar 12 separated by a common torsional resistive section such as pads 26 and 28 with resistive section 34, and pads 40 and 42 with resistive section 48 is determined by the clamping force required to produce sufficient friction to resist the induced torsional force being resisted in that length of the torsional resistive section. The factors influencing the clamping force required to resist the torsion are, the diameter of the torsion bar 12, the angle of twist of the torsion bar 12 and the stiffness of the torsional resistive section, e.g. 34 and 48. The ability to generate clamping force is determined by the screws selected, the radial spacing of the screws and the bearing area of the clamp pads.

The factors influencing the friction generated are, the clamping force normal to the surfaces and the coefficient of friction between the surfaces. It is advantageous for the clamp pad pairs 22, 36 and 24, 38 and 26, 40 and 28, 42 to be substantially the same diameter of the torsion bar 12.

The clamping force required is inversely proportional to the diameter of the torsion bar 12 being clamped. Therefore, the smaller the bar 12 the more force is required for a given torsion. The bearing area should allow the interface clamping pressure to generate the preferred bearing loading of about 17000 psi when steel components are used and the maximum force is desired. The maximum force is preferred when the torsional resistive section torsional resistance is equal to or greater than the torsional resistance of the clamped section of torsion bar 12. When the torsional resistance of the torsional resistive section is greater than that of the torsion bar 12 an increase in length of the torsional resistive section is met with an increase in stiffness of the overall torsion bar 12. This is because of the greater share of torsional load being taken by the torsional resistive section.

The maximum spacing between clamp pads is limited by the ability to generate clamping force. If this maximum spacing is exceeded the friction force available will not be sufficient to resist the torsional force generated. The maximum spacing is increased by lowering the resistance of the torsional resistive section. When the torsional resistive section torsional resistance is below that of the clamped section of torsion bar 12 the spacing of the clamp pad sections becomes optional. With the torsional resistance below that of the torsion bar 12 the share of torsional load taken by the torsional resistive section does not increase as the length of torsional resistive section increases. Therefore no overall torsional resistance is gained. This means that the desired increase in stiffness of the torsion bar 12 does not change as the spacing of the torsional resistive section changes when the resistance is below that of the torsion bar 12. Therefore it is efficient to allow the torsional resistive section to be of greater torsional resistance than that of the torsion bar for a clamped section.

Referring to FIG. 2, if the screws 58, 60 and 62, 64 are installed, the torsional resistance increase will be about half of the available were all screws installed. Likewise if screws 54, 56 were also to be installed, the torsional resistance increase would be about three quarters of the available torsional resistance were all screws installed. If screws 50, 52 and 54, 56 were installed alone, the torsional resistance increase would be about one quarter of the available torsional resistance were all screws installed. Thusly this invention is adjustable by increments as shown.

Those skilled in the art will appreciate that the number and placement of the torsional resistive sections may be varied as required. The cross section of the torsional resistive sections may be of suitable shapes. The connecting means between the clamp pads and the torsional resistive sections can be solid, welded, interlocking and otherwise restrained by design of those skilled in the art.

The screws for providing clamping force to the torsion bar by the clamp pads may be replaced with bolts and nuts and of varied numbers.

Although the preferred embodiment shown has two clamp pad sections per longitudinal location, those skilled in the art will appreciate that multiple clamp pad sections or clamp pad section and clamp pad cap may be used per longitudinal location to provide the clamping force required at one longitudinal location of the torsion bar.

The torsional resistive sections connecting the clamp pad sections may be connected to clamp pads at the same radial orientation or differing radial orientation of the clamp pads of the opposing ends a torsional resistive section.

Those skilled in the art will appreciate that the resistive sections and clamp pad sections may be constructed of any material that is suitable whether ferrous or nonferrous metal or non-metal material such as man made composite construction or plastic.

Although the configuration shown in FIG. 1 is that of a conventional upper and lower A-arm front suspension of a vehicle, the present invention can be used with any front or rear suspension configuration of the torsion bar type.

The present invention can be used on the suspension component known as a stabilizer bar (or sway bar) since the stabilizer bar is a type of torsion bar spring.

The term "chassis" as used here means conventional automotive frames as well as unitized automotive body structures.

The present invention may be used on torsion bar type springs other than automotive application.

This invention though described with respect to preferred embodiments modifications thereto will be apparent to those skilled in the art. Therefore, the scope of the invention is to be determined by reference to the claims which follow:

I claim:

1. For use with an elongated torsion bar spring having an outer surface, a stiffener for the torsion bar spring, comprising:
    elongated first and second stiffener sections together forming an elongated, axially divided tubular sleeve adapted to concentrically surround a longitudinal portion of the torsion bar spring,
    said first stiffener section comprising axially spaced apart clamp pads, each said clamp pad having an inner surface substantially conforming to the outer surface of the torsion bar spring, and a longitudinal torsional resistive section between the clamp pads having an inner surface that is spaced radially outwardly from the outer surface of the torsion bar spring,
    said second stiffener section comprising axially spaced apart clamp pads, each said clamp pad having an inner surface substantially conforming to the outer surface of the torsion bar spring, and a longitudinal torsional resistive section between the clamp pads having an inner surface that is spaced radially outwardly from the outer surface of the torsion bar spring,
    each clamp pad inner surface confronting a clamp pad inner surface on the other stiffener section; and
    fasteners extending transversely of the stiffener, for securing the two stiffener sections together, and pulling the clamp pad inner surfaces into tight clamping engagement with the torsion bar spring.

2. A stiffener according to claim 1, wherein each stiffener section comprises at least three axially spaced apart clamp pads, with each axially adjacent pair of said clamp pads being separated by a longitudinal torsional resistive section.

3. A stiffener according to claim 1, wherein each stiffener section comprises at least four axially spaced apart clamp pads, with each axially adjacent pair of said clamp pads being separated by a longitudinal torsional resistive section.

4. A stiffener according to claim 1, comprising a pair of said fasteners for each confronting pair of clamp pads, said fasteners being axially located in the clamp pad regions of the stiffener sections.

5. In combination:
    an elongated torsion bar spring having an outer surface; and
    a stiffener for the torsion bar spring, said stiffener comprising:
    elongated first and second stiffener sections together forming an elongated, axially divided tubular sleeve adapted to concentrically surround a longitudinal portion of the torsion bar spring,
    said first stiffener section comprising axially spaced apart clamp pads, each said clamp pad having an inner surface substantially conforming to the outer surface of the torsion bar spring, and a longitudinal torsional resistive section between the clamp pads having an inner surface that is spaced radially outwardly from the outer surface of the torsion bar spring,
    said second stiffener section comprising axially spaced apart clamp pads, each said clamp pad having an inner surface substantially conforming to the outer surface of the torsion bar spring, and a longitudinal torsional resistive section between the clamp pads having an inner surface that is spaced radially outwardly from the outer surface of the torsion bar spring,
    each clamp pad inner surface confronting a clamp pad inner surface on the other stiffener section; and
    fasteners extending transversely of the stiffener, for securing the two stiffener sections together, and pulling the clamp pad inner surfaces into tight clamping engagement with the torsion bar spring.

6. The combination of claim 5, wherein each stiffener section comprises at least three axially spaced apart clamp pads, with each axially adjacent pair of said clamp pads being separated by a longitudinal torsional resistive section.

7. The combination of claim 5, wherein each stiffener section comprises at least four axially spaced apart clamp pads, with each axially adjacent pair of said clamp pads being separated by a longitudinal torsion resistive section.

8. The combination of 5, comprising a pair of said fasteners for each confronting pair of clamp pads, said fasteners being axially located in the clamp pad regions of the stiffener sections.

* * * * *